E. W. BURGESS.
GRAIN DRILL.
APPLICATION FILED NOV. 22, 1916.

1,308,888.

Patented July 8, 1919.

Inventor
Edward W. Burgess.
By: Chas. E. Lord
Atty.

UNITED STATES PATENT OFFICE.

EDWARD W. BURGESS, OF CHICAGO, ILLINOIS, ASSIGNOR, BY MESNE ASSIGNMENTS, TO INTERNATIONAL HARVESTER COMPANY, A CORPORATION OF NEW JERSEY.

GRAIN-DRILL.

1,308,888.  Specification of Letters Patent.  Patented July 8, 1919.

Application filed November 22, 1916. Serial No. 132,813.

*To all whom it may concern:*

Be it known that I, EDWARD W. BURGESS, a citizen of the United States, residing at Chicago, in the county of Cook and State of Illinois, have invented certain new and useful Improvements in Grain-Drills, of which the following is a full, clear, and exact specification.

My invention relates to grain drills, and in particular to improved means whereby power is derived from the rotatable axle of the machine to assist the operator in raising the furrow openers from the ground.

The object of the invention is to provide a simple and efficient power lift mechanism for the purpose indicated.

This object is attained by means of the mechanism illustrated in the accompanying drawing, in which—

The same reference characters designate like parts throughout the several views.

Figure 1:
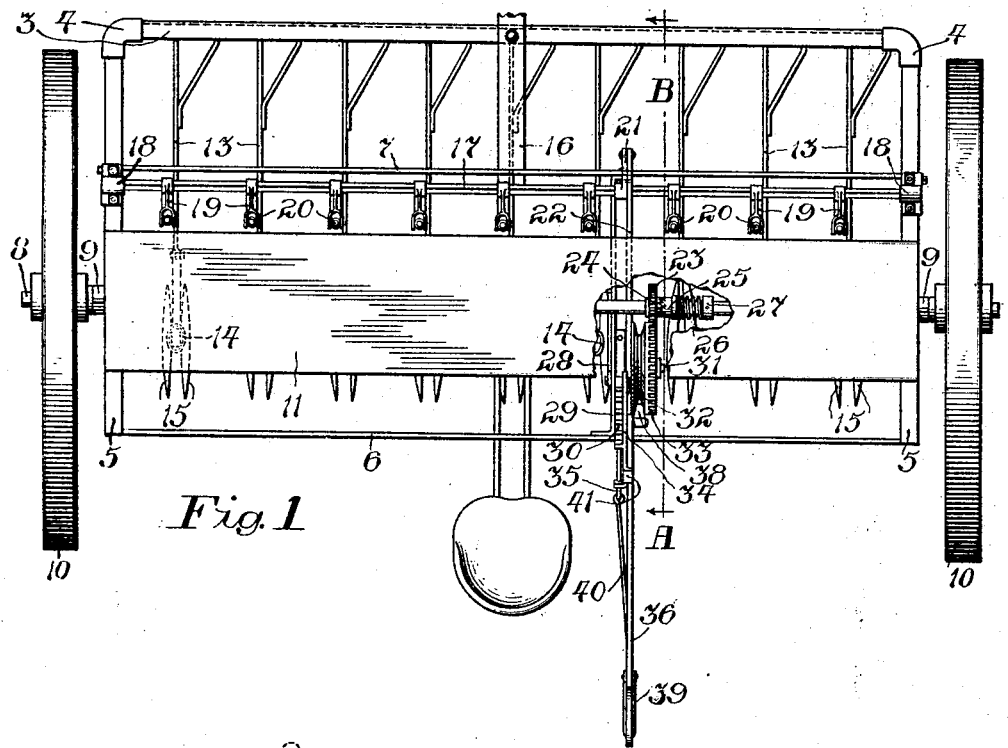
Figure 1 is a top plan view of a grain drill having my invention embodied in its construction.
Figure 2:
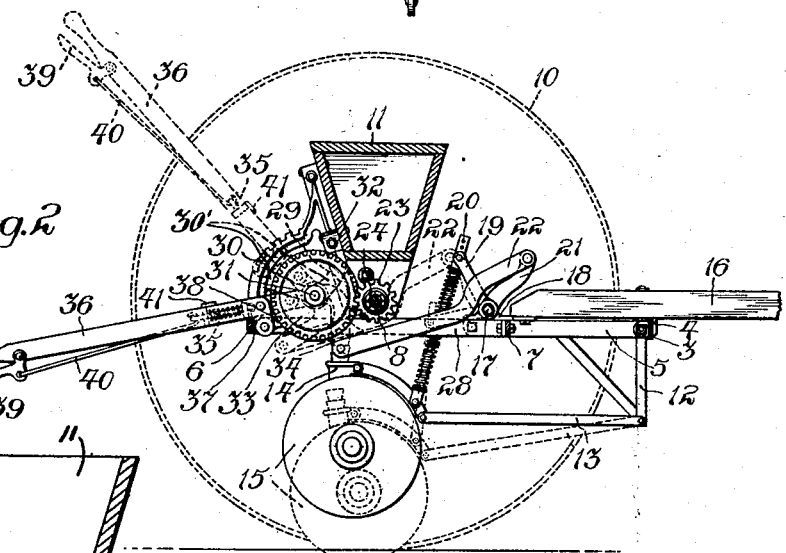
Fig. 2 is a sectional elevation of Fig. 1 along line A—B.
Figure 3:
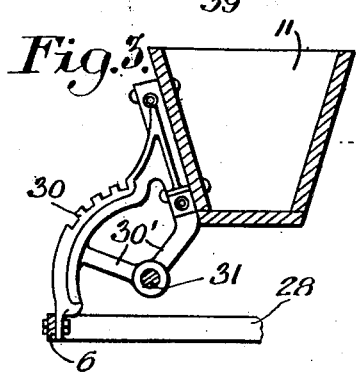
Fig. 3 is an enlarged detail view, partly in section, showing the construction of the sector and the coöperating parts.

The wheel frame of the grain drill includes a front transverse member 3 connected by means of corner members 4 with longitudinally disposed end frame members 5, 6 a transversely disposed member connecting the rear ends of the end frame members 5, and 7 a transverse member connecting the end members intermediate their ends. 8 represents a rotatable axle journaled in bearing boxes 9 secured to the end frame members 5 and having traction and carrying wheels 10 journaled upon its opposite ends, 11 a seed hopper carried by the frame, 12 a depending frame carried by the front of the wheel frame and to which are pivotally connected the front ends of a series of rearwardly extending rising and falling drag bars 13, to the rear ends of which are secured the grain boots 14, having furrow opening disks 15 journaled thereon, 16 a draft tongue secured to the wheel frame, 17 a transversely disposed rock shaft journaled in bearing boxes 18 secured to the end frame members 5 and having a series of pressure arms 19 secured thereto and having their free ends connected with the drag bars 13 by means of the usual pressure links 20. 21 represents an actuating arm secured to the rock shaft 17 and having its free end pivotally connected with the front end of a rearwardly extending curved bar 22.

The means for raising and lowering the furrow openers includes a pinion 23 journaled upon the rotatable axle 8 and provided with clutch elements 24 upon one end of its hub that normally engage with corresponding clutch elements carried by a clutch sleeve 25 splined upon the axle and pressed into engagement with the pinion by means of a pressure spring 26 encircling the shaft and reactive between an abutting collar 27 and the end of the sleeve. 28 represents a longitudinally disposed frame member having its front end secured to the frame member 7 and its rear end to the frame member 6, 29 a rearwardly and upwardly inclined bar having its lower end secured to the member 28 and its upper end to the rear wall of the seed hopper, 30 a toothed sector secured to the members 28 and 29 and having an axially disposed stud 31 secured by arms 30' thereto, upon which is journaled a combined friction sheave 32 and a gear wheel 33 meshing with the pinion 23 upon the axle 8 and constantly rotated thereby. Pivoted upon the stud 31 adjacent the sheave 32 is an L-shaped arm 34 having its lower end pivotally connected with the rear end of the curved bar 22. Carried by the upper end of the arm 34 is a slidable spring-pressed detent 35 adapted to engage with the toothed sector 30. 36 represents a hand lever having its lower end pivotally connected with the arm 34 adjacent the periphery of the sheave 32 and provided with a rearwardly extending arm 37, upon which is pivotally mounted a shoe member 38 adapted to engage with the friction sheave 32 when the hand lever 36 is turned rearward. 39 represents a thumb lever pivoted upon the free end of the hand lever and connected by means of a link 40 with the detent 35, and 41 a laterally projecting lip upon the upper end of the arm 34 adapted to engage with the hand lever 36 when it is turned upward and forward to lower the furrow opening disks.

In operation, as the machine advances the axle 8 is rotated by the traction wheels and the clutch sleeve 25 rotating with the axle drives the pinion 23 and, through the pinion, the gear wheel 33 and friction sheave 32. When it is desired to lift the furrow openers, the operator pulls back upon the hand lever 36, thereby forcing the shoe 38 into frictional engagement with the rotating sheave 32, causing the arm 34 to turn therewith and, through its connection with the rock shaft 17, turn it in a direction to lift the furrow openers. To lower the furrow openers, the hand lever is turned in an opposite direction and engaging with the lip 41 on the arm 34 turns the arm in a direction to cause the furrow openers to enter the soil and the detent 35 engaging with the toothed sector 30 regulates the depth of operation of the furrow openers. The friction sheave is relatively large and is rotated at approximately one-half the speed of the driving axle. The arm of the hand lever is relatively short and a pull of a few pounds upon the lever is sufficient to practically lock the shoe in engagement with the sheave in a manner to cause the arm 34 to turn substantially as one piece with the sheave. When it is desired to lift the furrow openers with the machine stationary, the clutch sleeve 25 will slide upon the axle against the pressure of the spring 26 and permit the pinion 23 to rotate independent of the axle.

Having shown and described one form which my invention may assume in practice, I do not desire that it be limited by the specific details of the structure as illustrated, it being understood that many changes may be made in the form, proportion and organization of its several parts without departing from the spirit of the invention as indicated by the scope of the appended claims.

What I claim as my invention, and desire to secure by Letters Patent, is:

1. A grain drill including, in combination, a wheel frame, traction wheels, a rotatable axle, rising and falling furrow openers, lever mechanism for raising and lowering said furrow openers, a rotatable friction element driven by power transmitted from said traction wheels, and means carried by said lever mechanism and adapted to be operatively connected with said friction element by the movement of said lever mechanism in one direction to assist said mechanism in raising and lowering said furrow openers.

2. A grain drill including, in combination, a wheel frame, traction wheels, a rotatable axle, rising and falling furrow openers, a lever for raising and lowering said furrow openers, and supplemental means rendered operative solely by movement of said lever in a predetermined direction about its pivot for assisting said lever in raising the furrow openers.

3. A grain drill including, in combination, a wheel frame, traction wheels, a rotatable axle, rising and falling furrow openers, lever mechanism for raising and lowering said furrow openers, a pinion mounted upon said axle, a friction element driven by said pinion and means carried by said lever mechanism and adapted to be operatively connected with said friction element to assist said lever mechanism in raising and lowering said furrow openers.

4. A grain drill including, in combination, a wheel frame, traction wheels, a rotatable axle, rising and falling furrow openers, a hand lever mechanism for raising and lowering said furrow openers, a pinion journaled upon said axle, a clutch mechanism connecting said pinion with said axle and driving it in one direction only, a gear wheel meshing with said pinion, a friction element rotatable with said gear wheel and adapted to coöperate with said hand lever mechanism.

5. A grain drill including, in combination, a wheel frame, traction wheels, a rotatable axle, rising and falling furrow openers, means for raising and lowering said furrow openers, said means including a pinion journaled upon said axle, a clutch mechanism connecting said pinion with said axle and driving it in one direction only, a gear wheel meshing with said pinion, a friction sheave rotatable with said gear wheel, an arm turnable about the axis of said gear wheel, a hand lever pivoted upon said arm, a brake shoe carried by said lever and adapted to engage with said friction sheave when said lever is turned in one direction, and operative connections between said arm and said furrow openers.

6. A grain drill including, in combination, a wheel frame, traction wheels, a rotatable axle, rising and falling furrow openers, means for raising and lowering said furrow openers, said means including a pinion journaled upon said axle, a clutch mechanism connecting said pinion with said axle and driving it in one direction only, a toothed sector carried by said wheel frame, a stud secured to said sector, a gear wheel journaled upon said stud and meshing with said pinion, a friction sheave rotatable with said gear wheel, an arm turnable about the axis of said gear wheel, a detent carried by said arm and adapted to engage with said toothed sector, a hand lever pivoted upon said arm, a brake shoe pivoted upon said lever and adapted to engage with said friction sheave when said lever is turned in one direction, and operative connections between said arm and said furrow openers.

7. A grain drill including, in combination, a wheel frame, traction wheels, a rotatable axle, rising and falling furrow openers, a lever for raising and lowering said furrow openers, and supplemental means pivoted to said lever for assisting the lever in raising the furrow openers and thrown into operation solely by movement of said lever in a direction to raise said furrow openers.

8. A grain drill including, in combination, a wheel frame, traction wheels, a rotatable axle, rising and falling furrow openers, a lever for raising and lowering said furrow openers, and supplemental power operated means pivoted to said lever for assisting the lever in raising the furrow openers, said last named means being thrown into operation solely by movement of said lever in a direction to raise said furrow openers.

9. A grain drill including, in combination, a wheel frame, traction wheels, a rotatable member operatively connected to said traction wheels, rising and falling furrow openers, a lever adapted to be connected to said rotatable member, and single means for connecting said lever to said rotatable member and for raising said openers by hand independently of said rotatable member.

10. A grain drill including, in combination, a wheel frame, traction wheels, a rotatable axle, a lever for raising and lowering said furrow openers, a second lever pivoted to said first mentioned lever, and power operated means adapted to coöperate with said second lever to assist the first lever in raising the furrow openers, said power operated means being connected to said second named lever by movement of said first named lever in a direction to raise said furrow openers.

11. A grain drill including, in combination, a wheel frame, traction wheels, a rotatable axle, rising and falling furrow openers, a lever for raising and lowering said furrow openers, a second lever pivoted to said first mentioned lever, power operated means adapted to coöperate with said second lever to assist the first lever in raising the furrow openers, and means carried by one of said levers and located in the path of movement of the other lever whereby the movement of the second named lever with respect to the first named lever is limited.

12. A grain drill including, in combination, a wheel frame, traction wheels supporting said frame, furrow openers carried by said frame, a rotatable member driven by power derived from said traction wheels, and means for connecting said furrow openers to said rotatable member to lift said openers by power, and single means for controlling said connecting means and for raising said openers by hand independently of said rotatable member.

13. A grain drill including, in combination, a wheel frame, a rotatable axle, a traction wheel, rising and falling furrow openers, a rotatable member driven by power derived from said traction wheels, a lever for raising and lowering said furrow openers independently of power derived from said wheels and having means adapted to contact with said rotatable member upon movement of said lever in one direction and to derive power therefrom whereby the furrow openers may be raised and lowered.

14. A grain drill including, in combination, a wheel frame, a traction wheel, rising and falling furrow openers, a rotatable member driven by power derived from said traction wheel, a lever for raising and lowering said furrow openers, and means carried by said lever for operatively connecting said lever to said rotatable element upon movement of said lever in one direction whereby the lever may be actuated by power derived from said element.

15. A grain drill including, in combination, a wheel frame, a rotatable axle, traction wheels, rising and falling furrow openers, a rotatable member driven by power derived from said traction wheels, a friction element carried by said rotatable member, a lever for raising and lowering said furrow openers, and a second lever carried by said first named lever and located in the path of said friction element and adapted to contact therewith when pressure is exerted on said second lever and to remain in contact until said pressure is released.

In testimony whereof I affix my signature.

EDWARD W. BURGESS.